US008069750B2

(12) United States Patent
Willemsen et al.

(10) Patent No.: US 8,069,750 B2
(45) Date of Patent: Dec. 6, 2011

(54) COMPACT PEDAL ASSEMBLY WITH IMPROVED NOISE CONTROL

(75) Inventors: Larry Willemsen, Morpeth (CA); Dan O'Neill, Chatham (CA)

(73) Assignee: KSR Technologies Co., Ridgetown (CA)

( * ) Notice: Subject to any disclaimer, the term of this patent is extended or adjusted under 35 U.S.C. 154(b) by 1153 days.

(21) Appl. No.: 11/836,484

(22) Filed: Aug. 9, 2007

(65) Prior Publication Data
US 2009/0038431 A1    Feb. 12, 2009

(51) Int. Cl.
*G05G 1/30*    (2008.04)
(52) U.S. Cl. .......................................... 74/512; 74/560
(58) Field of Classification Search ............ 74/512–514, 74/560; 188/73.1
See application file for complete search history.

(56) References Cited

U.S. PATENT DOCUMENTS

| | | | |
|---|---|---|---|
| 2,550,731 A | 5/1951 | Tack | |
| 2,550,732 A | 5/1951 | Tack et al. | |
| 2,860,720 A | 11/1958 | Huff et al. | |
| 2,860,780 A | 11/1958 | Huff et al. | |
| 2,906,842 A | 9/1959 | Brin | |
| 2,908,183 A | 10/1959 | DeGiovanni | |
| 2,936,867 A | 5/1960 | Perry | |
| 3,282,125 A | 11/1966 | Dully | |
| 3,301,088 A | 1/1967 | White | |
| 3,319,487 A | 5/1967 | Lystad et al. | |
| 3,338,348 A | 8/1967 | Roethlisberger at al. | |
| 3,400,607 A | 9/1968 | Smith | |
| 3,511,109 A | 5/1970 | Tanaka | |
| 3,563,111 A | 2/1971 | Zeigler | |
| 3,643,524 A | 2/1972 | Herring | |
| 3,643,525 A | 2/1972 | Gibas | |
| 3,646,831 A | 3/1972 | Janosi | |
| 3,678,779 A | 7/1972 | Janosi | |
| 3,691,868 A | 9/1972 | Smith | |
| 3,754,480 A | 8/1973 | Bodnar et al. | |
| 3,765,264 A | 10/1973 | Bruhn, Jr. | |
| 3,798,995 A | 3/1974 | Schroter et al. | |
| 3,958,677 A | 5/1976 | Spanelis | |
| 3,975,972 A | 8/1976 | Muhleck | |
| 4,386,537 A | 6/1983 | Lewis et al. | |
| 4,470,570 A | 9/1984 | Sakurai et al. | |
| 4,497,399 A | 2/1985 | Kopich | |
| 4,528,590 A | 7/1985 | Bisacquino et al. | |
| 4,683,977 A | 8/1987 | Salmon | |

(Continued)

FOREIGN PATENT DOCUMENTS

DE        3904616        8/1989

(Continued)

*Primary Examiner* — Vinh T. Luong
(74) *Attorney, Agent, or Firm* — Gifford, Krass, Sprinkle, Anderson & Citkowski, P.C.

(57) ABSTRACT

A compact vehicle pedal includes a mounting bracket having a lower arm with guide slot. A swing plate having a mounting face and upper arm with guide slot is pivotally interconnected to a mounting bracket upper arm at a first axis by a pivot pin disposed within the swing plate guide slot, and the swing plate upper end has a first degree of freedom. An electronically controlled pedal arm assembly is mounted on the swing plate. A screw member connected to a drive apparatus has an end connected to the swing plate and operatively connected to the mounting bracket slot at the second axis, and the swing plate lower end has a second degree of freedom that is greater than the first. Activation of the drive apparatus displaces the screw member to pivotally constrain movement of the swing plate about the first axis and the second axis.

10 Claims, 3 Drawing Sheets

U.S. PATENT DOCUMENTS

| | | | |
|---|---|---|---|
| 4,779,481 A | 10/1988 | Natzke et al. |
| 4,850,094 A | 7/1989 | Lybecker |
| 4,870,871 A | 10/1989 | Ivan |
| 4,875,385 A | 10/1989 | Sitrin |
| 4,883,037 A | 11/1989 | Mabee et al. |
| 4,912,997 A | 4/1990 | Malcolm et al. |
| 4,915,075 A | 4/1990 | Brown |
| 4,938,304 A | 7/1990 | Yamaguchi et al. |
| 4,958,607 A | 9/1990 | Lundberg |
| 4,969,437 A | 11/1990 | Kolb et al. |
| 4,986,238 A | 1/1991 | Terazawa et al. |
| 4,989,474 A | 2/1991 | Cicotte et al. |
| 5,010,782 A | 4/1991 | Asano et al. |
| 5,036,576 A | 8/1991 | Gast |
| 5,056,742 A | 10/1991 | Sakurai |
| 5,063,811 A | 11/1991 | Smith et al. |
| 5,078,024 A | 1/1992 | Cicotte et al. |
| 5,086,663 A | 2/1992 | Asano et al. |
| 5,121,889 A | 6/1992 | Carey, Jr. |
| 5,125,483 A | 6/1992 | Kitagawa et al. |
| 5,172,606 A | 12/1992 | Dzioba et al. |
| 5,211,072 A | 5/1993 | Barlas et al. |
| 5,214,834 A | 6/1993 | Froment et al. |
| 5,215,057 A | 6/1993 | Sato et al. |
| 5,233,882 A | 8/1993 | Byram et al. |
| 5,239,886 A | 8/1993 | Kohring |
| 5,241,936 A | 9/1993 | Byler et al. |
| 5,351,573 A | 10/1994 | Cicotte |
| 5,385,068 A | 1/1995 | White et al. |
| 5,408,899 A | 4/1995 | Stewart |
| 5,460,061 A | 10/1995 | Redding et al. |
| 5,497,677 A | 3/1996 | Baumann et al. |
| 5,632,183 A | 5/1997 | Rixon et al. |
| 5,697,260 A | 12/1997 | Rixon et al. |
| 5,722,302 A | 3/1998 | Rixon et al. |
| 5,771,752 A | 6/1998 | Cicotte |
| 5,819,593 A | 10/1998 | Rixon et al. |
| 5,823,064 A | 10/1998 | Cicotte |
| 5,884,532 A | 3/1999 | Rixon et al. |
| 5,887,488 A | 3/1999 | Riggle |
| 5,927,154 A | 7/1999 | Elton et al. |
| 5,937,707 A | 8/1999 | Rixon et al. |
| 5,996,438 A | 12/1999 | Elton |
| 5,996,439 A | 12/1999 | Elton et al. |
| 6,019,015 A | 2/2000 | Elton |
| 6,019,241 A | 2/2000 | Burns |
| 6,073,515 A | 6/2000 | Elton et al. |
| 6,109,241 A | 8/2000 | Engelgau |
| 6,151,984 A | 11/2000 | Johansson et al. |
| 6,151,985 A | 11/2000 | Garber et al. |
| 6,151,986 A | 11/2000 | Willemsen et al. |
| 6,173,625 B1 | 1/2001 | McFarlane et al. |
| 6,178,847 B1 | 1/2001 | Willemsen et al. |
| 6,212,970 B1 | 4/2001 | Bortolon |
| 6,237,565 B1 | 5/2001 | Engelgau |
| 6,289,761 B1 | 9/2001 | Reynolds et al. |
| 6,289,763 B1 | 9/2001 | Rixon et al. |
| 6,305,239 B1 | 10/2001 | Johansson et al. |
| 6,321,617 B1 | 11/2001 | Schwyn |
| 6,324,939 B1 | 12/2001 | Cicotte |
| 6,364,047 B1 | 4/2002 | Bortolon |
| 6,367,348 B1 | 4/2002 | Toelke et al. |
| 6,367,349 B1 | 4/2002 | Allen et al. |
| 6,374,695 B1 | 4/2002 | Johansson et al. |
| 6,389,927 B1 | 5/2002 | Willemsen et al. |
| 6,431,021 B1 | 8/2002 | Djordjevic et al. |
| 6,450,061 B1 | 9/2002 | Chapman et al. |
| 6,453,767 B1 | 9/2002 | Willemsen et al. |
| 6,520,045 B2 | 2/2003 | Fukase et al. |
| 6,584,871 B2 | 7/2003 | Burton et al. |
| 6,655,231 B2 | 12/2003 | Willemsen et al. |
| 6,662,677 B2 | 12/2003 | Rixon et al. |
| 6,722,226 B2 | 4/2004 | Neag et al. |
| 6,763,741 B2 | 7/2004 | Frobel et al. |
| 7,146,876 B2 | 12/2006 | Willemsen et al. |
| 7,353,729 B2* | 4/2008 | Willemsen et al. .............. 74/512 |
| 2002/0002874 A1 | 1/2002 | Burton et al. |
| 2002/0038577 A1 | 4/2002 | Bialk et al. |
| 2002/0088303 A1 | 7/2002 | Hayashihara et al. |
| 2002/0092374 A1 | 7/2002 | Johansson et al. |
| 2003/0056615 A1 | 3/2003 | Oberheide et al. |
| 2003/0084744 A1 | 5/2003 | Parenteau et al. |
| 2004/0000211 A1* | 1/2004 | Willemsen et al. .............. 74/512 |
| 2004/0031350 A1 | 2/2004 | Williams et al. |
| 2004/0217726 A1 | 11/2004 | Willemsen et al. |
| 2006/0169549 A1* | 8/2006 | Lang et al. .................... 188/73.1 |
| 2007/0137396 A1* | 6/2007 | Mahendra et al. .............. 74/512 |
| 2009/0223319 A1* | 9/2009 | Choi ............................... 74/512 |
| 2010/0107804 A1* | 5/2010 | Tervol et al. .................... 74/512 |

FOREIGN PATENT DOCUMENTS

| | | |
|---|---|---|
| EP | 0492873 | 7/1992 |
| EP | 0918273 | 5/1999 |
| FR | 2715485 | 7/1995 |
| FR | 2739947 | 4/1997 |
| GB | 952831 | 3/1964 |
| JP | 56141193 | 11/1981 |
| JP | 59224230 | 12/1984 |
| JP | 63270267 | 11/1988 |
| JP | 4219562 | 8/1992 |
| JP | 5185912 | 7/1993 |
| JP | 2002287837 | 10/2002 |
| SE | 518099 | 8/2002 |

\* cited by examiner

COMPACT PEDAL ASSEMBLY WITH IMPROVED NOISE CONTROL

FIELD OF THE INVENTION

This invention relates to pedals, and more particularly to a compact pedal assembly for a vehicle with improved noise control.

BACKGROUND OF THE INVENTION

Vehicles, such as motor vehicles, typically contain foot-actuated devices or pedals for controlling various functions of the vehicle. These functions are known to include: acceleration, controlled by an accelerator pedal; braking, controlled by a brake pedal; and shifting, controlled by a clutch pedal. In addition, the vehicle may include a non-functional pedal that serves as a footrest for the driver. The pedals are aligned in a predetermined dimensional relationship relative to each other and fixed portions of the vehicle, including the vehicle dash panel, floor, seat and instrument panel. The pedals are positioned in the vehicle so that they are accessible by the driver. However, drivers come in a wide variety of shapes and sizes, and a pedal positioned to accommodate a large driver with a large foot will generally be unreachable by a small driver with a small foot. In the past, the pedals were fixedly positioned so that the majority of drivers were accommodated, from a functional and ergonomic aspect. An example of a functional aspect of the pedal is the ability of the driver to reach and actuate the pedal. An example of an ergonomic aspect of the pedal is the driver's comfort while actuating the pedal, as measured by a parameter such as foot angle.

More recently, adjustable pedals have been used in vehicles to accommodate a greater number of drivers from a functional and ergonomic perspective. With an adjustable pedal, the driver can modify the position of the pedal so that it is either closer to the driver or away from the driver. At the same time, the relative dimensional relationships between the pedals are maintained during adjustment, such as the height relationship between each of the pedals. The pedal pad portion of the pedal assembly generally travels in a predetermined path during adjustment, such as an arc or a line. Thus, to move the pedal pad closer to the driver, the pedal pad typically moves along the path into the vehicle, closer to the driver. The pedal pad is moved away from the driver by moving the pedal pad along the path away from the driver. Examples of an adjustable control vehicle pedal are disclosed in commonly assigned U.S. Pat. Nos. 6,178,847 and 6,453,767 which are incorporated herein by reference.

These types of adjustable pedals work well, and include an adjustment mechanism comprising a motor, a drive mechanism operatively connected to the motor and a screw mechanism operatively connected to the pedal. However, the mechanisms are bulky, and during adjustment any side loading of the adjustment mechanism may result in the transmission of an audible noise. Thus, there is a need in the art for an ergonomically beneficial adjustable pedal assembly that has a more compact configuration, as well as improved stability and noise control.

SUMMARY OF THE INVENTION

Accordingly, the present invention is a compact pedal assembly with improved noise control. The compact pedal assembly includes a mounting bracket adapted for mounting to the vehicle. The mounting bracket is an F-shaped bracket having a mounting face portion that is adapted for mounting on the vehicle and an upper arm extending radially from an upper end of the mounting face portion to a free end, and a lower arm extending radially from a lower end of the mounting face portion to a free end that includes a longitudinally extending guide slot. The assembly includes a swing plate having a mounting face with an upper end and a lower end, and an upper arm extending radially from an upper edge of the mounting face upper end to a free end that includes a guide slot. The swing plate upper arm is pivotally interconnected to the mounting bracket upper arm by a pivot pin slidingly disposed within the swing plate guide channel at a first pivot axis, so that the upper end of the swing plate has a first degree of freedom of movement during pedal adjustment, and the first pivot axis is fixed during pedal actuation. A pedal arm assembly is mounted to the swing plate mounting face, and includes a pedal arm member having a pedal pad mounted to a lower end of the pedal arm member and an upper end operatively connected to an electronic control means that is responsive to the degree of relative movement of the pedal arm member about a third axis that is parallel to and juxtaposed between the first axis and a second axis, and to produce a control signal proportional to such movement about the third axis. The assembly also includes a drive apparatus mounted to the mounting bracket mounting face and a screw member having one end operatively connected to the drive apparatus, and an opposite end fixedly connected to the swing plate lower end and slidingly disposed within the mounting bracket lower arm guide channel at the second pivot axis so that the swing plate lower end has a second degree of freedom of movement relative to the mounting bracket during pedal adjustment. Activation of the drive apparatus to adjust the position of the pedal pad along a predetermined path between a non-adjusted position and a fully adjusted position displaces the screw member within the mounting bracket lower arm guide channel to pivot the swing plate and the pedal arm assembly together as a unit without relative movement between the pedal arm member and the pedal pad about the first pivot axis and the second pivot axis. The first degree of freedom is less than the second degree of freedom to constrain the pivotal movement of the swing plate.

One advantage of the present invention is that a compact pedal assembly with improved noise control is provided that occupies less space. Another advantage of the present invention is that a compact pedal assembly with improved noise control is provided that includes a swing plate for supporting a pedal assembly. A further advantage of the present invention is that a compact pedal assembly with improved noise control is provided that positively supports the adjustment mechanism for improved stability. Yet a further advantage of the present invention is that a compact pedal assembly with improved noise control is provided that positively constrains the adjustment screw, resulting in reduced noise during pedal adjustment.

Other features and advantages of the present invention will be readily understood as the same becomes better understood after reading the subsequent description when considered in connection with the accompanying drawings.

DETAILED DESCRIPTION OF THE PREFERRED EMBODIMENTS

Figure 1:
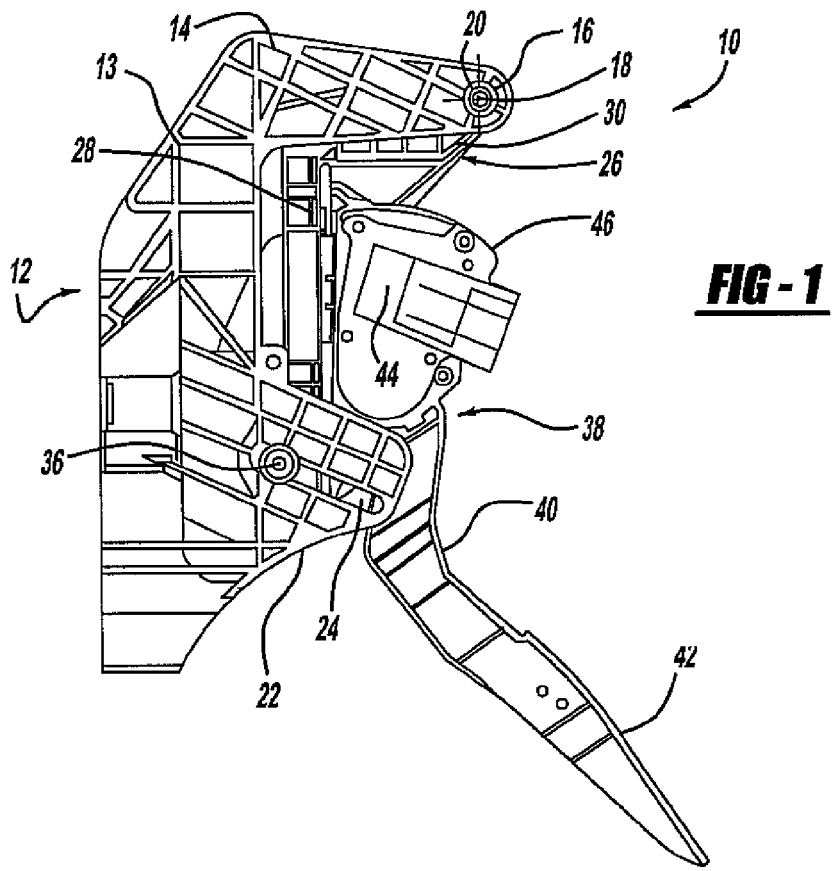
FIG. 1 is a side elevational view of a compact pedal assembly in a non-adjusted position, according to the present invention.
Figure 3:
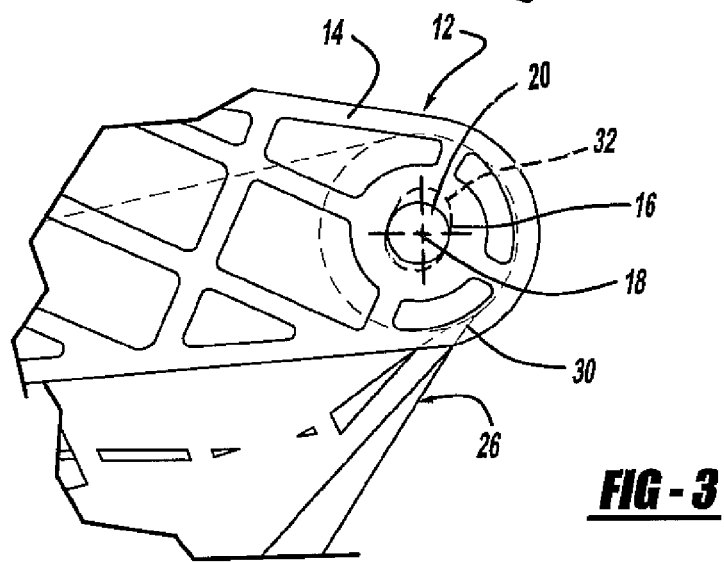
FIG. 3 is an enlarged side view of the first pivot point of FIG. 1, according to the present invention.
Figure 2:
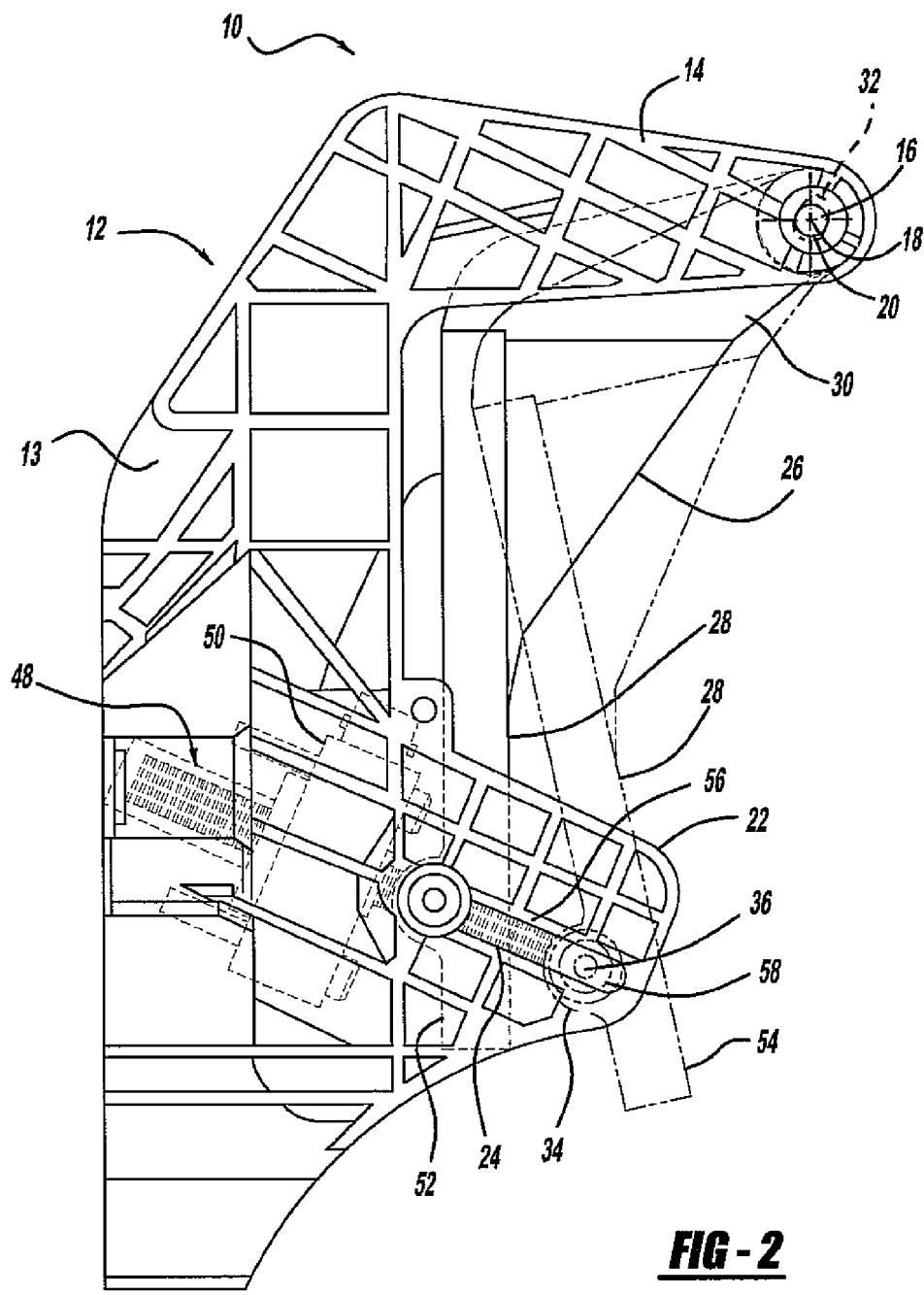
FIG. 2 is a partial side elevational view of the compact adjustable pedal assembly of FIG. 1 in an adjusted position and a non-adjusted position, according to the present invention.

Referring to FIGS. 1-3, a compact pedal assembly 10 for transferring a signal between a vehicle operator or driver (not shown) and an actuating mechanism (not shown) to control the movement of the vehicle, is illustrated. The pedal assembly 10 is an adjustable pedal assembly 10. In FIG. 1, the pedal assembly 10 is shown in a non-adjusted position, whereas in FIG. 2 the pedal assembly 10 is shown moving between a non-adjusted position and an adjusted position.

The pedal assembly 10 includes a mounting bracket 12, or mounting base for attaching the pedal assembly 10 to a portion of the vehicle. In this example, the mounting bracket 12 is attached to the dash panel (not shown). The mounting bracket 12 includes a generally planar mounting face 13. The mounting face 13 includes at least one aperture for attaching the mounting bracket 12 to the vehicle using an attaching means, such as by bolting or the like.

The mounting bracket 12 also includes an upper arm 14 or a pair of opposed upper arms 14 extending radially from an uppermost end of the mounting face 13. The upper arm operatively supports a swing plate in a manner to be described. The mounting bracket upper arm 14 includes an aperture 16 located at an outermost end of the upper bracket arm at a first pivot axis shown at 18. The upper arm aperture 16 is round in shape, and pivotally supports a pivot pin 20 and an adjustable swing plate, in a manner to be described. The mounting bracket 12 also includes a lower arm 22 extending radially from the mounting face 13. In this example, the lower arm 22 extends radially from a lower portion of the mounting bracket 12. The lower arm 22 is positioned below the upper arm 14. The lower arm 22 includes a substantially horizontally oriented slot 24. In this example, the lower arm slot 24 is inclined in a downwardly direction, with an upper edge of the slot located adjacent the mounting face 12 and a lower edge of the slot located below the upper edge of the slot 24 and an outer edge of the lower arm 22. The mounting bracket 12 generally has an "F" shape. A guide pin for the adjustment means is adjustably displaceable within the lower arm inclined slot, in a manner to be described.

The pedal assembly 10 also includes a swing plate 26. The swing plate 26 includes a generally planar mounting face 28, and an upper arm 30 extending radially from an upper edge of the swing plate mounting face 28 in an outward direction. An outermost end of the swing plate upper arm 30 includes a slot 32 for receiving a pivot pin for pivotally supporting the swing plate by the mounting bracket upper arm 14 at the first pivot axis 18. In this example, the swing plate slot 32 is oval and has a substantially vertical orientation. Further, the slot has a length of about 1-2 mm. The swing plate slot 32 provides for a predetermined degree of freedom of movement of the swing plate 26 relative to the mounting bracket 12 during adjustment. In this example, the swing plate 26 is pivotally and slidably attached between the mounting bracket upper arms 14 at a first pivot axis 18 using a conventionally known attaching means, such as pin 20 and clip or the like. In another example of one upper arm, the upper arm includes two finger-like projections, and the swing plate 26 is pivotally and slidably attached between the finger projections at the first pivot axis 18, as previously described. The first pivot axis 18 is fixed during pedal activation, and varies during pedal adjustment as the angular relationship between the swing plate 26 and bracket 12 varies during pedal adjustment due to movement of the swing plate with respect to the first pivot axis 18.

The swing plate 26 also includes an attachment portion 34 for securing the swing plate to the adjustment mechanism in a manner to be described. In this example, the attachment portion 34 of the swing plate 26 is a finger extending radially from a lower side edge of the swing plate mounting face 28 and directed towards the mounting bracket 12, for securing the lower end of the swing plate to the adjustment mechanism. The attachment portion 34 of the swing plate 26 is slidingly connected to the adjustment mechanism through the slot 24 in the mounting bracket lower arm 22 at a second, non-fixed attachment axis as shown at 36. It should be appreciated that in this example the second, non-fixed attachment axis 36 is positioned below, and radially inward, from the first pivot axis 18 located in the mounting bracket upper arm 14.

The swing plate 26 also includes a mounting face 28 for supporting a pedal arm assembly 38. In this example, the pedal arm assembly 38 includes an elongated pedal arm member 40 having an upper end and a lower end. The pedal arm assembly 38 includes a pedal pad 42 secured to the lower end of the pedal arm member 40. In this example, the pedal pad 42 is a rectangular member made from an isomeric material, such as rubber. An upper portion of the pedal arm member 40 is fixedly attached to the swing plate 26. The fixed attachment of the pedal arm assembly to the swing plate 26 allows for pivotal movement of the pedal arm assembly 38 about a third pedal arm pivot axis shown at 44 during actuation of the pedal arm assembly 38 by an operator of the vehicle. It should be appreciated that the third pedal arm pivot axis 44 is non-fixed during pedal adjustment as a result of the change in angular relationship between the mounting bracket 12 and the swing plate 26 during adjustment. Further, the third pedal arm pivot axis 44 is fixed during pedal operation. The third pedal arm pivot axis 44 is located between the first pivot axis 18 and second pivot axis 36. The third pedal arm pivot axis 44 is displaced as the pedal assembly 10 is adjusted, but not as the pedal assembly 10 is actuated.

In this example, the pedal arm assembly 38 includes an electronic position sensing device 46 for electronic control of an associated component, such as the engine. For example, the pedal assembly 10 is an electronically controlled throttle assembly, as is known in the art. An example of an electronic position sensing device 46 is a position sensor, potentiometer, inductive sensor, hall sensor or the like. The position sensing device 46 is located at the third pedal arm pivot axis 44, in order to detect the rotation of the pedal arm member 40 as a result of movement of the pedal pad 42 during actuation of the pedal arm assembly 38 by the operator. Movement of the pedal arm member 40 relative to the third pedal arm pivot axis 44 produces an electronic control signal proportional to the relative position of the pedal arm member 40, to operate the corresponding control, which in this example is an engine control. It should be appreciated that the pedal arm assembly may be attached to the swing plate as an integral unit.

The pedal assembly 10 further includes an adjustment mechanism 48 for adjusting the angular position of the swing plate 26 with respect to the mounting bracket 12, in order to adjust the initial starting location of the pedal pad 26. The adjustment mechanism 24 includes a drive motor 50 secured to the mounting bracket 12, for adjusting the relative location of the pedal arm member 40 between a nonadjusted position shown at 52 and a fully adjusted position shown at 54 or a position therebetween. The adjustment mechanism 48 also includes a screw rod 56. One end of the screw rod 56 is operatively attached to the drive motor, and the other end of the screw rod 56 is operatively attached to the swing plate attachment portion 34. In this example, a radially extending pin 58 interconnects the swing plate attachment portion 34 with the mounting bracket 12 at the second pivot axis 36. The pin 58 is slidingly disposed in the guide slot 24 in the mounting bracket lower arm 22. The drive motor 50 has a drive shaft with a worm gear portion, which engages a gear wheel with a threaded aperture to displace the screw rod 56 during adjustment. The drive motor 50 may be connected to the drive shaft by a cable to drive the shaft.

In operation, activation of the motor worm gear rotates the screw rod 56 to move the lower end of the swing plate 26 by displacing the screw rod 56 with respect to the guide slot 24 in the lower arm of the mounting bracket 12, and thus varying the second pivot axis 36. The pedal arm member 40 is adjusted in a predetermined direction, such as forwardly or rearwardly, depending upon the direction of rotation of the screw rod 56. In a non-adjusted position as shown in FIG. 2 at 52, the screw rod 56 is located at one end of the guide slot 24. As the second pivot axis 36 and the lower end of the swing plate 26 is displaced by movement of the screw rod 56, the pin 58 slides therethrough the guide slot 24. It should be appreciated that the shape and position of the guide slot 24 defines the travel of the swing plate 26 and the second pivot axis 36.

Concurrently, first pivot axis 18 in the upper end of the swing plate 26 begins to vary eccentrically within the swing plate guide slot 32. It should be appreciated that in this example the upper end of the swing plate and first pivot axis 18 moves in a downwardly and forwardly direction as the lower edge of the swing plate 26 and second pivot axis 36 moves rearwardly into the vehicle during pedal adjustment. Advantageously, the relative position of the pedal pad 52 with respect to the driver moves along a predetermined path towards the driver. This unique combination of selectively adjustable pivot axis constrains the motion of the swing plate 26 with respect to the lower arm guide slot 24 in the mounting bracket 12. The slot 32 in the upper end of the swing plate 26 provides a predetermined degree of freedom of movement of the upper end of the swing plate 26 relative to the mounting bracket 12. It also provides for a predetermined second degree of freedom of movement of the lower end of the swing plate 26 relative to the mounting bracket 12. The first degree of freedom is less than the second degree of freedom. Advantageously, side loading of the screw rod 56 during adjustment is reduced, as well as noise transmission through the screw rod and lower arm slot 24. As a result of the reduced load, a material such as plastic may be utilized in the worm gear. This may offer a cost or weight benefit.

Figure 4:
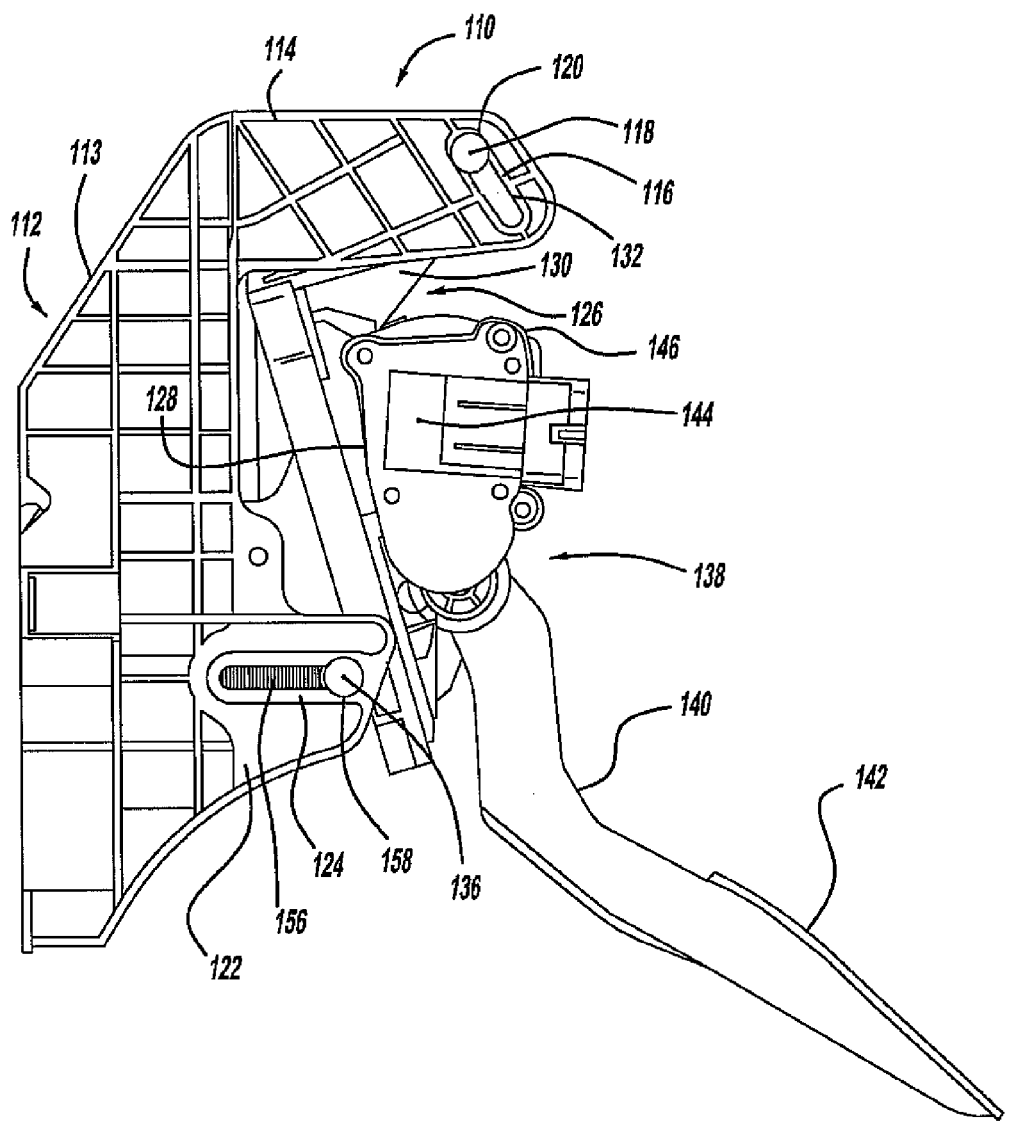
FIG. 4 is a side view of an alternative embodiment of the pedal assembly of FIG. 1, according to the present invention.

Another embodiment of a compact pedal assembly 110 is illustrated in FIG. 4. In this example, like features have like reference numerals increased by 100. The pedal assembly 110 is illustrated in a fully adjusted position. The aperture 116 in the upper arm 114 of the mounting bracket 112 is an elongated slot. The elongated slot 116 has a generally vertical orientation. The slot 116 may be inclined with an upper end of the slot 116 closer to the mounting bracket mounting face 113 than a lower end of the slot 116. The compact pedal assembly 10 operates in a manner similar to the previously described example. As the pedal is adjusted, the first pivot axis 18 and upper end of the swing plate move upwardly as the second pivot axis 36 and lower end of the pedal arm move rearwardly into the vehicle. The lower arm slot 124 in the lower end of the mounting bracket 112 has a horizontal orientation in this example, although other configurations are envisioned.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

The invention claimed is:

1. A compact pedal assembly for a vehicle comprising:
   a mounting bracket adapted for mounting to the vehicle, wherein the mounting bracket is an F-shaped bracket having a mounting face that is adapted for mounting on the vehicle and an upper arm extending radially from an upper end of the mounting face to a free end, and a lower arm extending radially from a lower end of the mounting face to a free end that includes a longitudinally extending guide slot;
   a swing plate having a mounting face with an upper end and a lower end, and an upper arm extending radially from an upper edge of the mounting face upper end to a free end that includes a guide slot, wherein the swing plate upper arm is pivotally connected to the mounting bracket upper arm by a pivot pin slidingly disposed within the swing plate guide slot at a first pivot axis, so that the upper end of the swing plate has a first degree of freedom of movement during pedal adjustment, and the first pivot axis is fixed during pedal actuation;
   a pedal arm assembly mounted to the swing plate mounting face, wherein the pedal arm assembly includes a pedal arm member having a pedal pad mounted to a lower end of the pedal arm member and an upper end operatively connected to an electronic position sensing device;
   a drive apparatus mounted to the mounting bracket mounting face; and
   a screw member having one end operatively connected to the drive apparatus, and an opposite end that is connected to the swing plate lower end and slidingly disposed within the mounting bracket lower arm guide slot at a second pivot axis that is below the third pivot axis, so that the swing plate lower end has a second degree of freedom of movement relative to the mounting bracket during pedal adjustment, wherein activation of the drive apparatus to adjust the position of the pedal pad along a predetermined path between a non-adjusted position and a fully adjusted position displaces the screw member within the mounting bracket lower arm guide slot and the pivot pin in the swing plate guide slot to pivot the swing plate and the pedal arm assembly together as a unit without relative movement between the pedal arm member and the pedal pad about the first pivot axis and the second pivot axis, and the first degree of freedom is less than the second degree of freedom to constrain the pivotal movement of the swing plate.

2. The compact pedal assembly as set forth in claim 1 wherein the swing plate guide slot has a substantially vertical orientation, with an upper end inclined towards the free end of the swing plate upper arm.

3. The compact pedal assembly of claim 2 wherein the mounting bracket lower arm guide slot has a substantially horizontal orientation.

4. The compact pedal assembly of claim 3 wherein the mounting bracket lower arm guide slot is inclined in a downwardly direction, with an upper edge of the lower arm guide slot adjacent the mounting face and a lower edge of the lower arm guide slot adjacent the free end of the mounting bracket lower arm.

5. The compact assembly of claim 1 further comprising a guide pin slidingly disposed within the mounting bracket lower arm guide slot for slidingly connecting the swing plate, screw member, and mounting bracket lower arm, such that the pin is guided through the mounting bracket lower arm guide slot as the screw member is displaced.

6. A compact pedal assembly for a vehicle comprising:
a mounting bracket adapted for mounting to the vehicle, wherein the mounting bracket is an F-shaped bracket having a mounting face that is adapted for mounting on the vehicle and an upper arm extending radially from an upper end of the mounting face to a free end, and a lower arm extending radially from a lower end of the mounting face to a free end that includes a longitudinally extending guide slot having a generally horizontal orientation;
a swing plate having a mounting face with an upper end and a lower end, and an upper arm extending radially from an upper edge of the mounting face upper end to a free end that includes a guide slot having a generally vertical orientation, wherein the swing plate upper arm is pivotally connected to the mounting bracket upper arm by a pivot pin slidingly disposed within the swing plate guide slot at a first pivot axis, so that the upper end of the swing plate has a first degree of freedom of movement during pedal adjustment, and the first pivot axis is fixed during pedal actuation;
a pedal arm assembly mounted to the swing plate mounting face, wherein the pedal arm assembly includes a pedal arm member having a pedal pad mounted to a lower end of the pedal arm member and an upper end operatively connected to an electronic position sensing device;
a drive apparatus mounted to the mounting bracket mounting face; and
a screw member having one end operatively connected to the drive apparatus, and an opposite end operatively connected to the swing plate lower end and the mounting bracket at a second pivot axis that is below the third pivot axis by a guide pin slidingly disposed within the mounting bracket lower arm guide slot, and the guide pin is guided through the mounting bracket lower arm guide slot as the screw member is displaced, and the swing plate lower end has a second degree of freedom of movement relative to the mounting bracket during pedal adjustment, wherein activation of the drive apparatus to adjust the position of the pedal pad along a predetermined path between a non-adjusted position and a fully adjusted position displaces the screw member and guide pin within the mounting bracket lower arm guide slot and the pivot pin in the swing plate guide slot, to pivot the swing plate and the pedal arm assembly together as a unit without relative movement between the pedal arm member and the pedal pad about the first pivot axis and the second pivot axis, and the first degree of freedom is less than the second degree of freedom to constrain the pivotal movement of the swing plate.

7. The compact pedal assembly of claim 6 wherein the swing plate guide slot has an upper end inclined towards the free end of the swing plate upper arm.

8. The compact pedal assembly of claim 7 wherein the mounting bracket lower arm guide slot is inclined in a downwardly direction and has an upper edge adjacent the mounting face and a lower edge adjacent the free end of the mounting bracket lower arm.

9. A compact pedal assembly for a vehicle comprising:
a mounting bracket adapted for mounting to the vehicle, wherein the mounting bracket is an F-shaped bracket having a mounting face that is adapted for mounting on the vehicle and an upper arm extending radially from an upper end of the mounting face to a free end that includes a guide slot having a generally vertical orientation, and a lower arm extending radially from a lower end of the mounting face to a free end that includes a guide slot having a generally horizontal orientation;
a swing plate having a mounting face with an upper end and a lower end, and an upper arm extending radially from an upper edge of the mounting face upper end to a free end, wherein the swing plate upper arm is pivotally interconnected to the mounting bracket upper arm by a pivot pin slidingly disposed within the mounting bracket upper arm guide slot at a first pivot axis, so that the upper end of the swing plate has a first degree of freedom of movement during pedal adjustment, and the first pivot axis is fixed during pedal actuation;
a pedal arm assembly mounted to the swing plate mounting face, wherein the pedal arm assembly includes a pedal arm member having a pedal pad mounted to a lower end of the pedal arm member and an upper end operatively connected to an electronic position sensing device;
a drive apparatus mounted to the mounting bracket mounting face; and
a screw member having one end operatively connected to the drive apparatus, and an opposite end that is connected to the swing plate lower end and the mounting bracket at a second pivot axis that is below the third pivot axis by a guide pin slidingly disposed within the mounting bracket lower arm guide slot that is guided through the mounting bracket lower arm guide slot as the screw member is displaced, so that the swing plate lower end has a second degree of freedom of movement relative to the mounting bracket during pedal adjustment, wherein activation of the drive apparatus to adjust the position of the pedal pad along a predetermined path between a non-adjusted position and a fully adjusted position displaces the screw member and guide pin within the mounting bracket lower arm guide channel and the pin within the mounting bracket upper arm guide channel to pivot the swing plate and the pedal arm assembly together as a unit without relative movement between the pedal arm member and the pedal pad about the first pivot axis and the second pivot axis, and the first degree of freedom is less than the second degree of freedom to constrain to constrain the pivotal movement of the swing plate.

10. The compact pedal assembly of claim 9 wherein the mounting bracket upper arm guide slot has an upper end inclined towards the mounting bracket mounting face.

* * * * *